United States Patent
Venkatesh et al.

(10) Patent No.: US 11,831,141 B2
(45) Date of Patent: Nov. 28, 2023

(54) DUAL COIL ARMATURE FOR SUPERVISION RELAY OF TRIP COIL

(71) Applicant: Hitachi Energy Ltd., Zurich (CH)

(72) Inventors: Loganadhan Venkatesh, Bengaluru (IN); Shambhulingappa Siragappala, Bengaluru (IN); Ashoka Shyama Prasad, Bengaluru (IN); Uthaya Kumar, Bengaluru (IN)

(73) Assignee: Hitachi Energy Ltd., Zurich (CH)

( * ) Notice: Subject to any disclaimer, the term of this patent is extended or adjusted under 35 U.S.C. 154(b) by 721 days.

(21) Appl. No.: 16/963,996

(22) PCT Filed: Jan. 22, 2019

(86) PCT No.: PCT/IB2019/050519
§ 371 (c)(1),
(2) Date: Jul. 22, 2020

(87) PCT Pub. No.: WO2019/145848
PCT Pub. Date: Aug. 1, 2019

(65) Prior Publication Data
US 2021/0036502 A1 Feb. 4, 2021

(30) Foreign Application Priority Data
Jan. 23, 2018 (IN) .............. 201841002642

(51) Int. Cl.
*H02H 3/04* (2006.01)
*H01H 9/00* (2006.01)
*H01H 47/00* (2006.01)

(52) U.S. Cl.
CPC .......... *H02H 3/044* (2013.01); *H01H 9/0066* (2013.01); *H01H 47/005* (2013.01)

(58) Field of Classification Search
CPC ........ H02H 3/04; H02H 3/044; H01H 9/0066; H01H 47/002; H01H 47/005
(Continued)

(56) References Cited

U.S. PATENT DOCUMENTS 3,935,515 A * 1/1976 Janycky .................. H02H 3/04
361/194
6,359,763 B1 3/2002 Edwards
(Continued)

FOREIGN PATENT DOCUMENTS

CN 1262444 A * 8/2000 .......... H01H 47/002
CN 1262444 A 8/2000
(Continued)

OTHER PUBLICATIONS

Machine translation of Adhwas Chinese Patent Document CN 1262444 A Aug. 9, 2000 (Year: 2000).*

*Primary Examiner* — Kevin J Comber
(74) *Attorney, Agent, or Firm* — Slater Matsil, LLP (57) ABSTRACT

An apparatus includes a circuit breaker having main contacts configured to be coupled within an electrical line. The circuit breaker also has trip contacts and auxiliary contacts. A protection relay is electrically coupled to the trip contacts of the circuit breaker and is configured to trip the circuit breaker. A trip circuit supervision relay has a first coil electrically coupled to the auxiliary contacts of the circuit breaker and a second coil electrically coupled to the trip contacts of the circuit breaker. The first coil and the second coil are magnetically coupled to each other. The trip circuit supervision relay is single circuit supervision relay that includes both first coil and the second coil and is configured to be magnetically operated by either of the first coil and the second coil.

22 Claims, 9 Drawing Sheets

(58) Field of Classification Search
USPC .......................................................... 361/93.1
See application file for complete search history.

(56) References Cited

U.S. PATENT DOCUMENTS

2012/0013200 A1* 1/2012 Kroeker ............... H01H 50/543
307/115
2012/0014032 A1* 1/2012 De Natale ............ H01H 47/002
361/160

FOREIGN PATENT DOCUMENTS

| CN | 102340122 A | | 2/2012 | |
|---|---|---|---|---|
| EP | 0994546 A2 | | 4/2000 | |
| EP | 2149895 A1 | | 2/2010 | |
| EP | 2407993 A1 | | 1/2012 | |
| EP | 2407995 A1 | | 1/2012 | |
| GB | 2272119 A | * | 5/1994 | ............... H02H 3/04 |
| GB | 2272119 A | | 5/1994 | |

* cited by examiner

Figure 1a

| Circuit breaker Open or Close | Trip Contact Open or close | Coil A | Coil B | TCS Relay Status |
|---|---|---|---|---|
| Open | Open | 1 | 1 | Picked Up |
| Closed | Open | 1 | 0 | Picked up |
| Open | Closed | 0 | 1 | Picked up |
| Closed | Closed | 0 | 0 | Drop-Off |

DUAL COIL ARMATURE FOR SUPERVISION RELAY OF TRIP COIL

CROSS-REFERENCE TO RELATED APPLICATIONS

This application is a national phase application of International Application No. PCT/IB2019/050519, filed on Jan. 22, 2019, which application claims priority to Indian Patent Application No. 201841002642, filed Jan. 23, 2018, which applications are hereby incorporated herein by reference.

FIELD OF THE INVENTION

The present invention relates generally to a trip circuits and more particularly to a method of supervising a trip circuit using a trip supervision relay.

BACKGROUND OF THE INVENTION

A conventional trip circuit in an apparatus, such as a medium voltage circuit breaker, controls the opening and closing driver, driving the opening and closing operations through a switch. In traditional mechanical circuit breaker, the driver is a shunt release consisting in an electromagnet that releases a spring. As a result, the spring performs the required opening or closing operation.

As known to the person skilled in art, circuit breakers are provided in electrical circuits to disconnect part of high voltage electrical circuit in response to the closing of a contact (the trip contact) attached to a low voltage electrical circuit. The trip contact and supply voltage form a part of a trip circuit. The circuit breaker may therefore comprise a trip coil and a circuit breaker contact. Closing the trip contact causes current to flow in the trip coil of the circuit breaker, which results in the opening of the circuit breaker and the disconnection of the high voltage circuit. When a fault occurs in the high voltage circuit, it is important that the circuit breaker can operate to disconnect the circuit, to minimize the damage caused. In order to detect the functionality and reliability of applications continuous checking of the trip circuit is required for which purpose Trip Circuit Supervision (TCS) relays are normally used. Common Trip Circuit Supervision relays are designed to check the low impedance of the trip circuit and to detect when the trip circuit turns into an open circuit. This occurs when the connection is broken, or the wire of the electromagnet winding is burned by an overcurrent.

Conventionally, most supervision relays are devices to supervise during post-close condition of the circuit breaker trip coil. Certain utilities have the practice of supervising the trip coil even during pre-close condition to ensure proper healthiness of the trip circuit. In this supervision for pre-close condition relays make use of another coil and a separate auxiliary voltage to derive this functionality.

Currently it is a challenge to achieve monitoring of trip coil and cable circuit connecting to the trip contact of breaker in both pre-close and post-close condition, and also breaker contact failure such that the logic circuit should be rugged enough to sustain intermediate disturbances caused during the operation of the trip coil (mainly inductance).

SUMMARY

The above-mentioned shortcomings, disadvantages and problems are addressed herein which will be understood by reading and understanding the following specification.

In one aspect, the present invention provides a method for monitoring a health condition of a trip circuitry associated with trip operation of a circuit breaker and a status of circuit breaker contacts with a trip circuit supervision relay, the circuit breaker is connected in an electrical line and operates to interrupt a current flowing in the electrical line by opening main contacts and has auxiliary contacts to indicate the status of the circuit breaker contacts, and wherein the circuit breaker is electrically connected with a protection relay at the trip contacts and is tripped with a signal from the protection relay, and wherein the trip circuitry includes the electrical connection between the protection relay and the circuit breaker, and the trip coils to activate tripping of the circuit breaker, the method comprises: utilizing auxiliary contacts for monitoring the status of circuit breaker with the trip circuit supervision relay by electrically connecting the auxiliary contacts with a first coil in the trip circuit supervision relay; utilizing the trip contacts for monitoring the health condition of the trip circuitry associated with trip operation of the circuit breaker with a second coil in the trip circuit supervision relay; wherein the first coil and the second coil are comprised within a single trip circuit supervision relay and the trip circuit supervision relay is magnetically operated by any of the first coil and the second coil to indicate the status of the circuit breaker and the health condition of the trip circuitry associated with the circuit breaker.

BRIEF DESCRIPTION OF DRAWINGS

The appended drawings illustrate exemplary embodiments as disclosed herein and are not to be considered limiting in scope. In the drawings.

DETAILED DESCRIPTION

The present invention is related to monitoring a health condition of a trip circuitry associated with trip operation of a circuit breaker and a status of circuit breaker contacts with a trip circuit supervision relay.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized. The following detailed description is, therefore, not to be taken in a limiting sense.

Figure 1A:
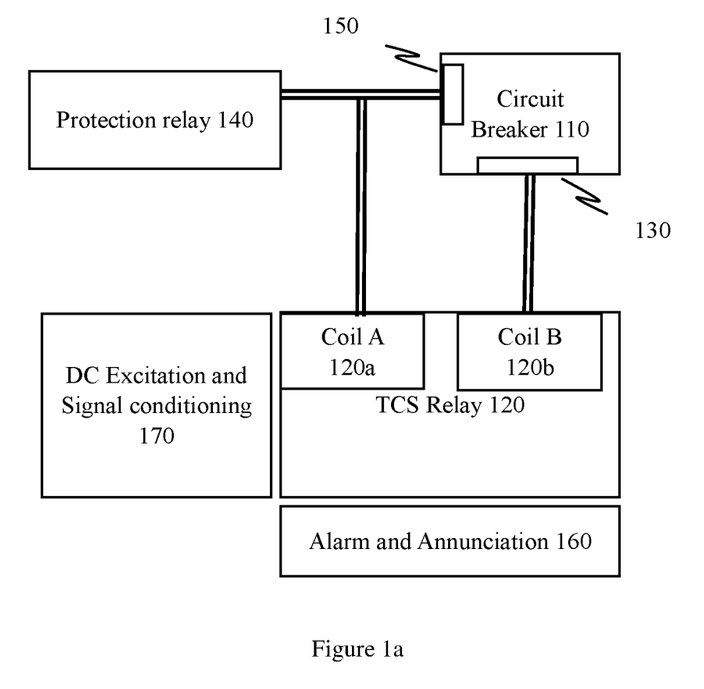
FIG. 1a shows a block diagram of the elements for monitoring health condition of trip circuitry.

FIG. 1 shows a block diagram of the elements for monitoring health condition of trip circuitry associated with trip operation of a circuit breaker 110 and a status of circuit breaker contacts (not shown) with a trip circuit supervision relay 120. The trip circuit supervision (TCS) 120 relay comprises two coils, coil A (120a) and coil B (120b). The circuit breaker 110 is connected in an electrical line and operates to interrupt a current flowing in the electrical line by opening main contacts and has auxiliary contacts 130 to indicate the status of the circuit breaker contacts. The circuit breaker 110 is electrically connected with a protection relay 140 at the trip contacts 150 and is tripped with a signal from the protection relay 140. The trip circuitry includes the electrical connection between the protection relay and the circuit breaker, and the trip coils to activate tripping of the circuit breaker 110. The FIG. 1 also shows the other elements associated with the TCS relay 120 like the alarm and annunciation block 160. The alarm and annunciation block 160 may comprise means for alerting a status of the TCS relay for example alarms, Light Emitting Diodes (LEDs) to indicate health condition of the trip circuitry. DC Excitation and Signal Conditioning block 170 is provided for DC supply and requisite electronics for conditioning signal while achieving desired time delays for example an RC circuit.

In an embodiment of the invention in order to achieve monitoring of trip coil and cable circuit connecting to the trip contact of the circuit breaker in both pre-close and post-close condition along with breaker contact failure an OR gate logic is being utilized with two inputs & one output. The circuit is rugged enough to sustain intermediate disturbances and changes caused during the operation of the trip coil (mainly inductance). To achieve the ruggedness a double layer winding on single magnetic circuit is used, means coils are electrically isolated but magnetically linked and each coil is connected to separate RC circuits for drop-off delay. The relay armature circuit and associated electronic circuitry is being modified. The relay armature holds a dual coil winding so that one coil will be connected across protection trip contact 150 and the cable will be in series to the second coil that gets energized in breaker pre-close condition. As will be appreciated by persons skilled in the art that the coil winding be calculated for accommodating both the coils (coil A 120a and coil B 120b) on same bobbin space of core.

There are three possible healthy conditions for the coil A and B coil B to trigger functioning of the trip circuit relay 120 i.e. for the TCS relay to be in picked up state:
a) A coil get energized,
b) B coil get energized,
c) A and B both get energized.

Both the coils are designed with a maximum AT (ampere-turn) ratio needed for the TCS relay to pick up at rated voltage. The advantage of double layer winding when both coils are in series is that the total resistance gets doubled and the current reduces to half the value, but the overall ampere turns get doubled thereby compensating the required AT to the same value of pick up voltage.

In an embodiment of the present invention the, a Printed Circuit Board Assembly (PCBA) circuit can be designed to have two RC network for drop-off delay and diodes for directional blocking. A set of LEDs to indicate the position and healthiness of the circuit and to hold the coil armature when there is an intermittent state of the circuit breaker position. An RC circuit for achieving the drop off time required to prevent the relay from issuing false alarm during change-over of breaker auxiliary contact position. Also, the LED to indicate the status that the breaker coil has been getting monitored in pre-close and post-close condition of the breaker.

Monitoring of circuit breaker closing and opening is done by two different coils of the same TCS relay which is achieved by having dual coil windings on a single core which are wound one above the other which are electrically isolated using insulations. The coil A, the first layer over bobbin will monitor when protection trip contact is in open position and coil B will monitor through the auxiliary breaker contact (referred as the 52b normally closed contact or auxiliary contact) that will be in normally closed position during circuit breaker open condition.

Figure 1B:
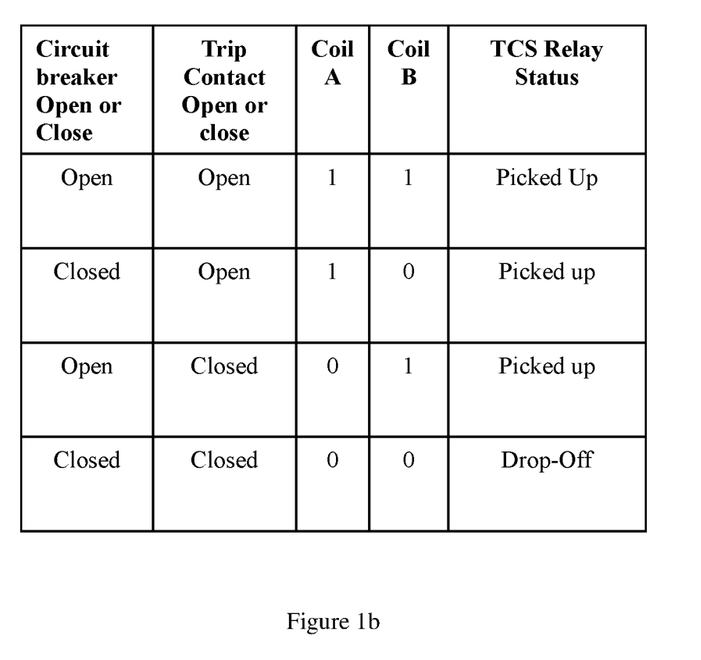
FIG. 1b shows a truth table illustrating the status of the trip circuit supervision relay.

FIG. 1b shows a truth table illustrating the status of the trip circuit supervision relay. The condition of circuit breaker trip coil and its associated contacts can be considered as an OR gate logic. Based on the logic table the armature has to hold the coil during conditions where any of the coils A or coil B is energized.

Figure 2:
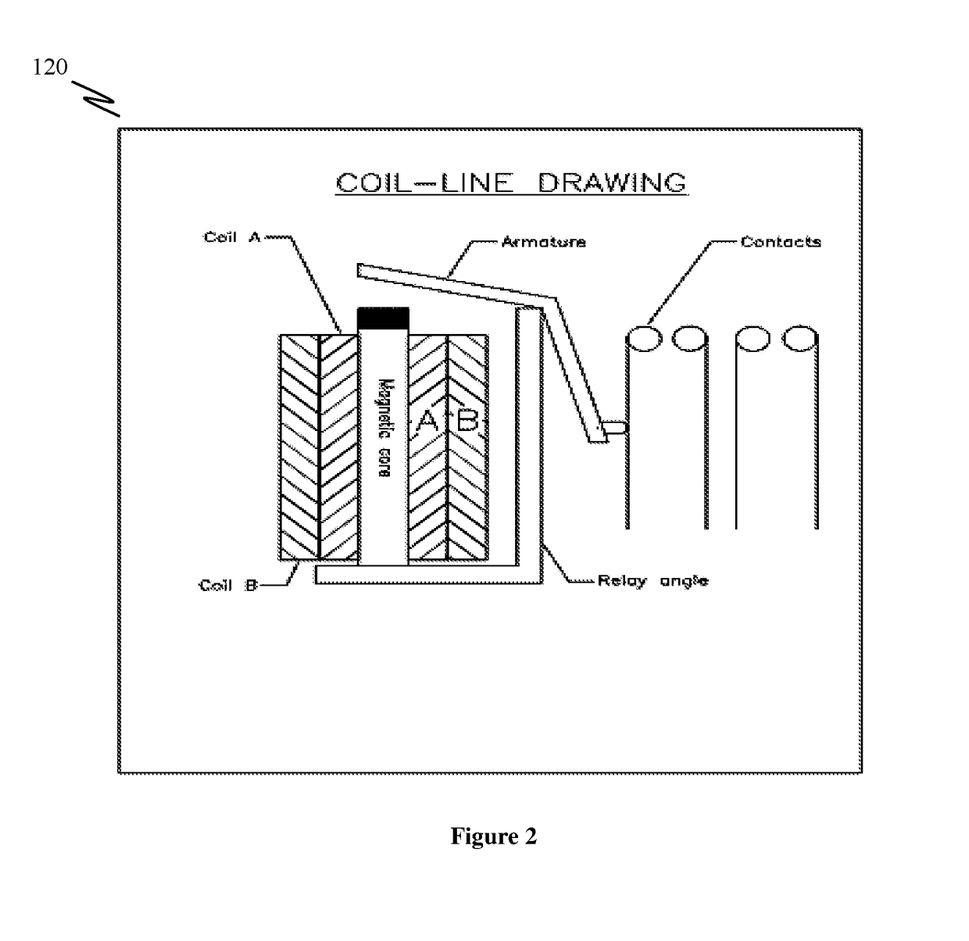
FIG. 2 shows a construction of the trip circuit supervision relay.

FIG. 2 shows a construction of the trip circuit supervision relay 120. In this TCS relay 120 there are two coils are used as mentioned in the text herein above. The coils are electrically insulated and magnetically connected. One insulation layer is just above the core and the second layer is above one of the coils to isolate electrically. The TCS relay 120 shown in FIG. 2 shows a relay angle to support the armature that actuates the contacts wherein the armature is the moving part of the TCS relay that is magnetically operated by the set of coils: coil A and coil B. The TCS relay 120 is designed to monitor DC supply of trip coil in breaker and its associated circuits to provide alarm. In case of trip coil supervision, the cable which is connecting from protection relay trip contact to the beaker coil through auxiliary contacts of it will be monitored as an additional feature.

Figure 3:
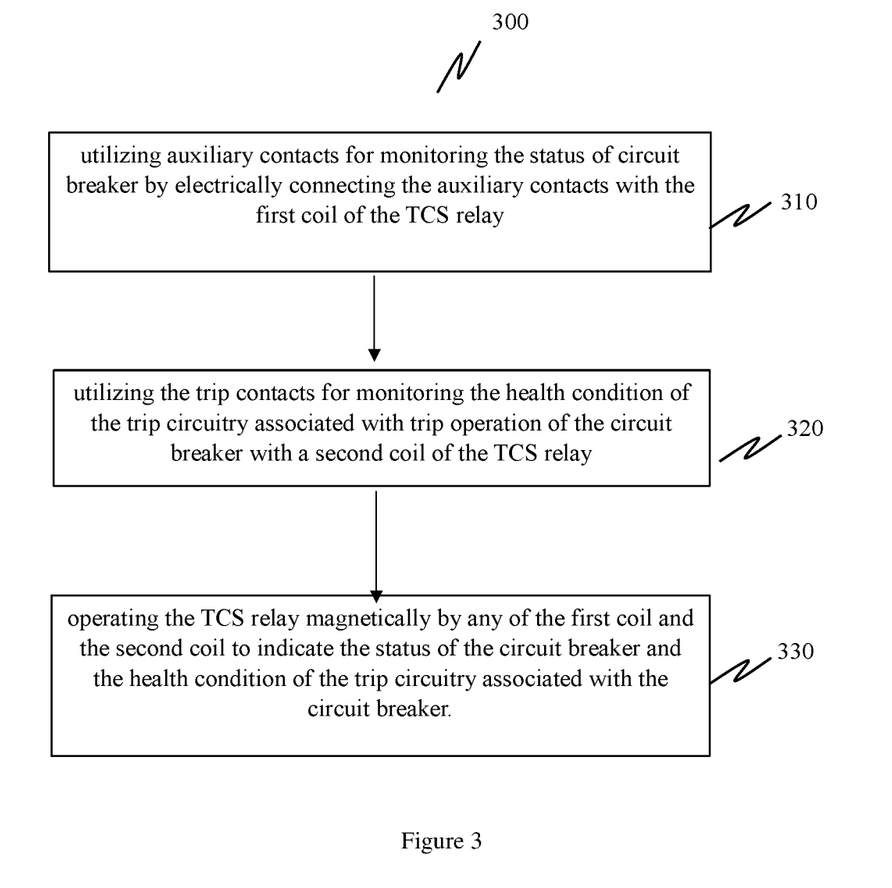
FIG. 3 shows a flow diagram of the method for monitoring health condition of trip circuitry.

FIG. 3 shows a flow diagram 300 of the method for monitoring health condition of trip circuitry. As shown in FIG. 3, as a first step of the method for monitoring health condition of trip circuitry, step 310 shows the auxiliary contacts of the circuit breaker are used for monitoring the status of circuit breaker with the trip circuit supervision relay by electrically connecting the auxiliary contacts with the first coil in the trip circuit supervision relay. The auxiliary contacts or 52b contacts as known to the persons skilled in the art are normally closed contacts for circuit breaker in open position. As a second step 320, the trip contacts are used for monitoring the health condition of the trip circuitry associated with trip operation of the circuit breaker with the second coil in the trip circuit supervision relay. As observed in FIG. 1a and FIG. 2, the first coil and the second coil (coil A and coil B) are comprised within a single trip circuit supervision relay. As shown in step 330 the trip circuit supervision relay is magnetically operated by any of the first coil and the second coil to indicate the status of the circuit breaker and the health condition of the trip circuitry associated with the circuit breaker.

In an embodiment two LEDs can be provided for alerting purposes to indicate the various monitoring conditions. For example, in a configuration both LEDs can glow in case of circuit breaker open/pre-close condition and protection trip contact in open position. And only one LED glows when breaker is in post close condition. In such a manner all the conditions for monitoring can be alerted using LEDs.

In an embodiment a self-resettable flag which drops out when there is loss of DC supply due to faults on trip coil and its associated circuits irrespective of breaker position can be achieved. In an embodiment failure of TCS relay itself can be indicated for example while monitoring operation of auxiliary contacts if a dropout delay of more than 300 ms is observed an abnormal operation can be detected.

The TCS relay comprises an electromechanical auxiliary contact and parallel RC circuit for drop-out delay. The TCS relay has dual coil circuit on a single magnetic core that supervise the trip coil circuit irrespective of breaker position. The LEDs can be connected in series with the auxiliary contacts of the relay coil to show healthiness of the trip coil circuit and circuit breaker position.

FIG. 4a, FIG. 4b, FIG. 4c, FIG. 4d and FIG. 4e show the various conditions for the circuit breaker position and protection trip contacts.

Figure 4A:
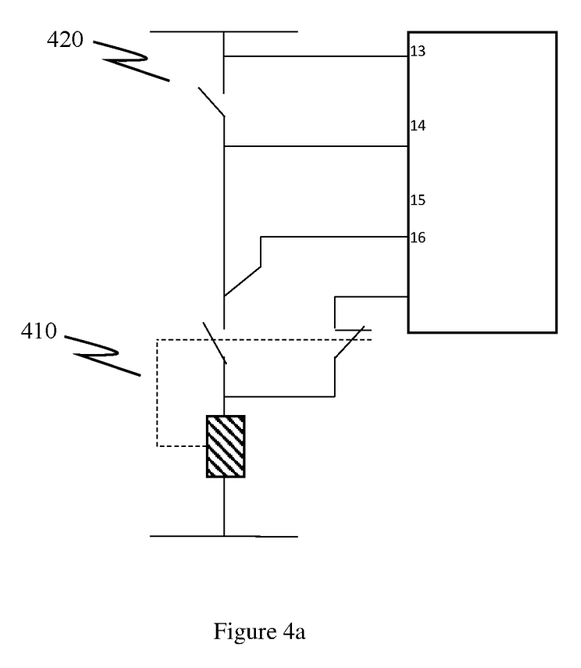
FIG. 4a shows a condition when the circuit breaker is in pre-close condition with protection trip contact in open condition.

FIG. 4a shows a condition when the circuit breaker 410 is in pre-close condition with protection trip contact 420 in open condition. When the circuit breaker is in open condition and protection trip contact is in open position than the minimum current required to flow through the coil along with circuit breaker trip coil resistance should be of 2.5 mA to supervise. In this condition both LED to indicate pre-close condition (referred as pre-close LED) and LED to indicate post-close condition (post-close LED) will be showing healthy status. If the cable connecting the protection trip relay contact to the circuit breaker coil is opened or if DC supply is lost, the relay will dropout in greater than 300 ms and gives an alarm.

Figure 4B:
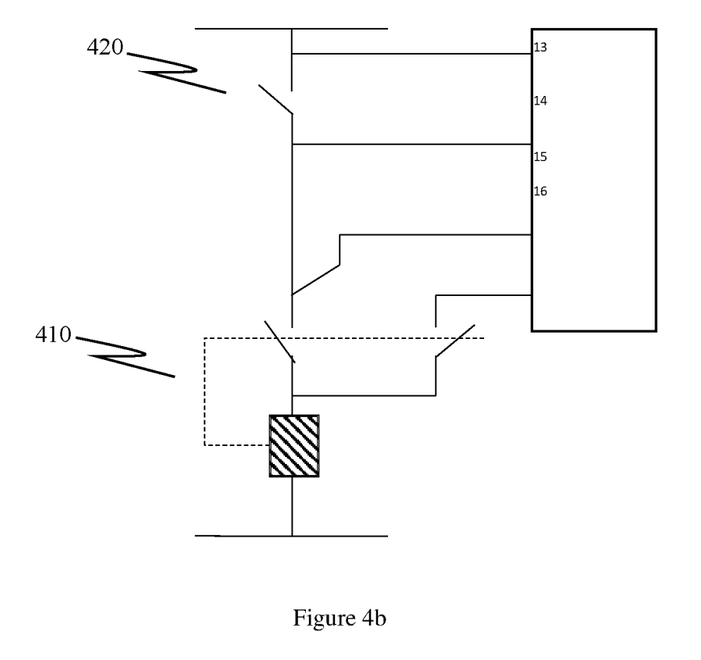
FIG. 4b shows the circuit breaker closing position with protection trip open.

FIG. 4b shows the circuit breaker closing position 410 with protection trip 420 in open condition. When the circuit breaker gets closing command the auxiliary contacts of breaker will be in intermediate state which in turn will cause the dual coil to get de-energized. During this action, both coil will lose the supply and RC circuit will supply the coil to be in hold until the breaker changes its state. If contact changeover has some mal-operation/failure happens at greater than 300 ms when it will provide an alarm.

Figure 4C:
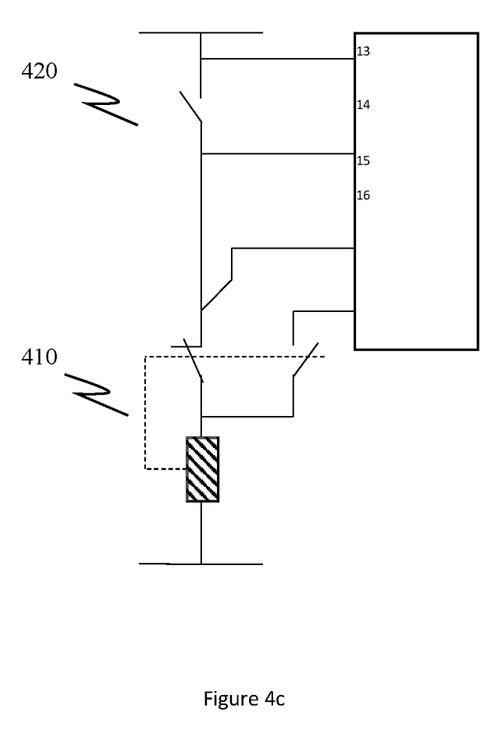
FIG. 4c shows the circuit breaker in post-close condition with protection trip in open state.

FIG. 4c shows the circuit breaker 410 in post-close condition with protection trip contact 420 in open state. When the circuit breaker in close condition and protection trip contact in open position than the minimum current required to flow through the coil along with circuit breaker trip coil resistance should be of 5 mA to supervise. In this condition, Post-close LED will be showing healthy status. In this position if DC supply is lost, the relay will dropout in greater than 300 ms and sets of an alarm.

Figure 4D:
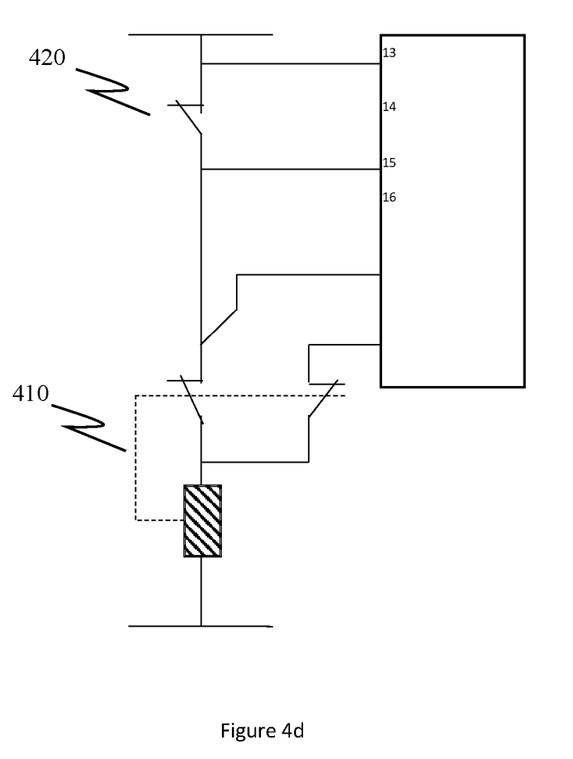
FIG. 4d shows the circuit breaker in opening condition with protection trip in close state.

FIG. 4d shows the circuit breaker 410 in opening condition with protection trip contact 420 in close state. When the circuit breaker gets trip command through protection trip contact the breaker trip coil energized to open breaker and the auxiliary contacts of breaker will be in intermediate state which in turn will cause one of the dual coil in relay across trip contacts which was in supervision position gets de-energized. During this action, RC circuit will hold the supply to coil until the circuit breaker changes its state. If trip contact is latched and changeover has some mal-operation/failure happens leading to continuous supply to trip coil, then it will provide an alarm.

Figure 4E:
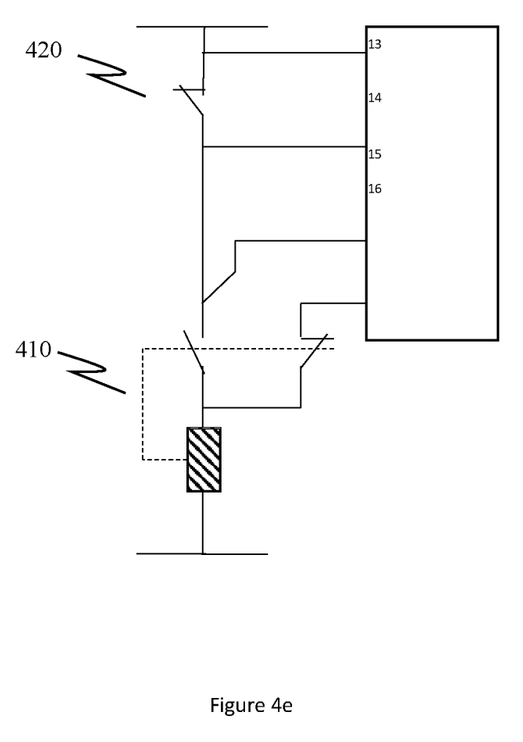
FIG. 4e shows the circuit breaker in pre-close condition with protection trip in open condition

FIG. 4e shows the circuit breaker 410 in pre-close condition with protection trip 420 in open condition. When protection trip contact is in latch position, the circuit breaker gets changed over to open condition and then the current required to flow through the coil along with circuit breaker trip coil resistance should be of 5 mA in order to supervise the trip circuitry. This will be the current through pre-close LED via one of the dual coil of the TCS relay via the auxiliary contact of the circuit breaker to the trip coil. In this condition, pre-close LED will be showing healthy status. Also, there is monitoring for a condition for a loss of DC supply or open circuit of the cable that is connecting the protection trip contact to the coils of the circuit breaker.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An apparatus comprising:
   a circuit breaker having main contacts configured to be coupled within an electrical line, the circuit breaker also having trip contacts and auxiliary contacts;
   a protection relay electrically coupled to the trip contacts of the circuit breaker and configured to trip the circuit breaker;
   a trip circuit supervision relay having a first coil electrically coupled to the auxiliary contacts of the circuit breaker and a second coil electrically coupled to the trip contacts of the circuit breaker, the first coil and the second coil being magnetically coupled to each other;
   wherein the trip circuit supervision relay is single circuit supervision relay that includes both first coil and the second coil and is configured to be magnetically operated by either of the first coil and the second coil; and
   wherein the first coil and the second coil are configured so that either coil can independently activate tripping of the circuit breaker based on a status of the circuit breaker determined from the auxiliary contacts and a health condition of trip circuitry associated with trip operation of the circuit breaker determined from the trip contacts.

2. The apparatus as claimed in claim 1, wherein the trip circuitry includes an electrical connection between the protection relay and the circuit breaker.

3. The apparatus as claimed in claim 1, wherein the auxiliary contacts are normally closed contacts during a main contact open condition of the circuit breaker.

4. The apparatus as claimed in claim 1, further comprising a cable connecting the trip contacts to the circuit breaker through auxiliary contacts.

5. The apparatus as claimed in claim 4, wherein the health condition of the trip circuitry comprises a health condition of the cable.

6. The apparatus as claimed in claim 1, wherein the first coil is wound on top of second coil and the first coil is electrically insulated from the second coil.

7. The apparatus as claimed in claim 1, further comprising an RC circuit configured to generate a drop-out delay during a change-over of a circuit breaker auxiliary contact position.

8. The apparatus as claimed in claim 1, wherein the circuit breaker is coupled in the electrical line.

9. The apparatus as claimed in claim 1, further comprising an alarm circuit coupled to the trip circuit supervision relay.

10. A method of operating the apparatus of claim 1, the method comprising:
    flowing current in the electrical line and through the circuit breaker;
    monitoring the status of circuit breaker using the trip circuit supervision relay;
    monitoring the health condition of the trip circuitry using the trip circuit supervision relay; and activating tripping of the circuit breaker to interrupt a current flowing in the electrical line, the activating caused by the first coil based on the monitoring of the status of the circuit breaker or by the second coil based on the monitoring of the health condition.

11. A trip circuit supervision relay comprising:
   a magnetic core;
   a first coil surrounding a first portion of the magnetic core and configured to be coupled to auxiliary contacts of a circuit breaker to monitor a status of the circuit breaker;
   a second coil surrounding a second portion of the magnetic core and configured to be coupled to trip contacts of the circuit breaker, the second coil being electrically insulated from and magnetically coupled to the first coil; and
   an armature magnetically movable by either of the first and second coils to actuate contacts of the trip circuit supervision relay;
   wherein the trip circuit supervision relay is configured to be independently magnetically operated by either the first coil or the second coil to indicate a status of the circuit breaker and a health condition of trip circuitry associated with the circuit breaker.

12. The trip circuit supervision relay as claimed in claim 11, wherein the trip circuit supervision relay is configured to monitor a health condition of trip circuitry associated with a trip operation of the circuit breaker and a status of circuit breaker contacts, the auxiliary contacts of the circuit breaker to indicate the status of the circuit breaker contacts.

13. The trip circuit supervision relay as claimed in claim 12, wherein the trip circuitry includes an electrical connection between a protection relay and the circuit breaker.

14. The trip circuit supervision relay as claimed in claim 11, wherein the first coil is wound on top of second coil.

15. The trip circuit supervision relay as claimed in claim 14, further comprising an insulation layer between the first and second coils.

16. The trip circuit supervision relay as claimed in claim 11, wherein the trip circuit supervision relay is configured to monitor a DC supply of a trip coil in the circuit breaker.

17. The trip circuit supervision relay as claimed in claim 11, wherein the trip circuit supervision relay is further configured to monitor a cable that connects from a protection relay trip contact to a circuit beaker coil.

18. The trip circuit supervision relay as claimed in claim 11, comprises an RC circuit for achieving a drop-out delay to during change-over of circuit breaker auxiliary contact position.

19. A method for monitoring a health condition of a trip circuitry associated with trip operation of a circuit breaker and a status of circuit breaker contacts with a trip circuit supervision relay, the circuit breaker being connected in an electrical line and operating to interrupt a current flowing in the electrical line by opening main contacts and having auxiliary contacts to indicate the status of the circuit breaker contacts, wherein the circuit breaker is electrically connected with a protection relay at trip contacts of the trip circuitry and is tripped with a signal from the protection relay, and wherein the trip circuitry includes the electrical connection between the protection relay and the circuit breaker, and the trip coils to activate tripping of the circuit breaker, the method comprising:
   utilizing auxiliary contacts for monitoring the status of circuit breaker with the trip circuit supervision relay by electrically connecting the auxiliary contacts with a first coil in the trip circuit supervision relay; and
   utilizing the trip contacts for monitoring the health condition of the trip circuitry associated with trip operation of the circuit breaker with a second coil in the trip circuit supervision relay;
   wherein the first coil and the second coil are magnetically coupled to each other and are comprised within a single trip circuit supervision relay and the trip circuit supervision relay is independently magnetically operated by either the first coil or the second coil to indicate the status of the circuit breaker and the health condition of the trip circuitry associated with the circuit breaker.

20. The method as claimed in claim 19, wherein the auxiliary contacts are normally closed contacts during main contact open condition of the circuit breaker.

21. The method as claimed in claim 19, wherein monitoring the health condition of the trip circuitry associated with the trip operation of the circuit breaker further comprises monitoring the health of a cable connecting trip contact to the circuit breaker through auxiliary contacts.

22. The method as claimed in claim 19, wherein the first coil is wound on top of second coil and the first coil is electrically insulated from the second coil.

* * * * *